(12) United States Patent
Steimer

(10) Patent No.: US 7,313,008 B2
(45) Date of Patent: Dec. 25, 2007

(54) CONVERTER CIRCUIT FOR PRODUCING LOW HARMONICS

(75) Inventor: Peter Steimer, Ehrendingen (CH)

(73) Assignee: ABB Schweiz AG, Baden (CH)

( * ) Notice: Subject to any disclaimer, the term of this patent is extended or adjusted under 35 U.S.C. 154(b) by 150 days.

(21) Appl. No.: 10/564,982

(22) PCT Filed: Jun. 24, 2004

(86) PCT No.: PCT/CH2004/000388

§ 371 (c)(1),
(2), (4) Date: Jan. 18, 2006

(87) PCT Pub. No.: WO2005/008874

PCT Pub. Date: Jan. 27, 2005

(65) Prior Publication Data

US 2007/0096701 A1 May 3, 2007

(30) Foreign Application Priority Data

Jul. 23, 2003 (EP) .................................. 03405558

(51) Int. Cl.
*H02M 7/5387* (2006.01)
(52) U.S. Cl. ........................... 363/98; 363/132; 363/43
(58) Field of Classification Search ................ 363/17, 363/43, 98, 132
See application file for complete search history.

(56) References Cited

U.S. PATENT DOCUMENTS 5,731,970 A * 3/1998 Mori et al. .................. 363/132
5,801,936 A * 9/1998 Mori et al. .................. 363/132

(Continued)

FOREIGN PATENT DOCUMENTS

WO 01/93412 A2 12/2001
WO 03/017457 A1 2/2003

OTHER PUBLICATIONS

*Toshifumi Yoshikawa et al., "Analysis of Parallel Operation Methods of PWM Inverter Sets for an Ultra-High Speed Elevator", IEEE, Feb. 6, 2000, pp. 944-950, Fifteenth Annual IEEE, New Orleans, LA, USA, Piscataway, NJ, USA, IEEE, XP-010371647 (cited in the International Search Report mentioned below).

(Continued)

*Primary Examiner*—Bao Q. Vu
(74) *Attorney, Agent, or Firm*—Buchanan Ingersoll & Rooney PC

(57) ABSTRACT

A converter circuit is specified for at least one phase (R, Y, B), which converter circuit has a first switching group system which is provided for each phase (R, Y, B) and has a first main switching group which is formed by a power semiconductor switch and by a capacitor which is connected to the power semiconductor switch, and which first switching group system has at least one intermediate switching group which is formed by two series-connected power semiconductor switches which can be driven and by a capacitor, with the or one intermediate switching group being connected to the first main switching group. Furthermore, the first switching group system has a second main switching group which is formed by a power semiconductor switch, with the or an intermediate switching group being connected to the second main switching group. For simplicity and in order to improve the reliability of the converter circuit, the power semiconductor switch in the first main switching group and the power semiconductor switch in the second main switching group are each formed by only one passive electronic component which cannot be driven and has a unidirectional current-flow direction. In order to increase the capability to store electrical energy when there are a plurality of phases (R, Y, B), the first switching group systems in the phases (R, Y, B) are connected in parallel with one another.

20 Claims, 10 Drawing Sheets

U.S. PATENT DOCUMENTS

| | | | |
|---|---|---|---|
| 6,020,713 A * | 2/2000 | Geis et al. | 318/801 |
| 6,226,192 B1 * | 5/2001 | Yamanaka et al. | 363/56.01 |
| 6,307,760 B1 * | 10/2001 | Ikimi | 363/39 |
| 6,353,547 B1 * | 3/2002 | Jang et al. | 363/132 |
| 6,459,596 B1 | 10/2002 | Corzine | |
| 6,567,278 B2 * | 5/2003 | Rufer et al. | 363/17 |
| 6,621,719 B2 * | 9/2003 | Steimer et al. | 363/43 |
| 6,750,633 B2 * | 6/2004 | Schreiber | 322/12 |
| 2001/0026460 A1 * | 10/2001 | Ito et al. | 363/34 |
| 2003/0043603 A1 * | 3/2003 | Schreiber | 363/37 |
| 2003/0060326 A1 | 3/2003 | McLeod et al. | |
| 2003/0128563 A1 | 7/2003 | Romero | |

OTHER PUBLICATIONS

*International Search Report dated Sep. 7, 2004.
*International Preliminary Examination Report dated Oct. 28, 2005.
*European Search Report dated Jan. 13, 2004 (with English translation of category of cited documents).
*Form PCT/IPEA/409 (International Preliminary Report on Patentability).

* cited by examiner

CONVERTER CIRCUIT FOR PRODUCING LOW HARMONICS

This application is based on and claims priority to European Application No. 03405558.2, filed on Jul. 23, 2003 and International Application No. PCT/CH2004/000388, filed on Jun. 24, 2004 designating the U.S., the entire contents of both of which are hereby incorporated by reference.

TECHNICAL FIELD

The invention relates to the field of power electronics, and relates in particular to a converter circuit as claimed in the precharacterizing clause of the independent claims.

PRIOR ART

Nowadays, converter circuits are used in a wide range of power-electronic applications. The requirements for a converter circuit such as this are in this case firstly to produce harmonic levels that are as low as possible in an electrical AC voltage network which is connected in the normal manner to phases of the converter circuit, and on the other hand to transmit power levels that are as high as possible with as small a number of electronic components as possible. One suitable converter circuit is specified in WO 01/93412 A2. In this document, a first switching group system is provided for each phase and has a first main switching group which is formed by a power semiconductor switch and by a capacitor which is connected to the power semiconductor switch. The power semiconductor switch in the first main switching group is formed by a bipolar transistor with an insulated drive electrode (IGBT—Insulated Gate Bipolar Transistor) and by a diode which is connected back-to-back in parallel with the bipolar transistor. The power semiconductor switch in the first main switching group is thus formed by an active electronic component which can be driven, specifically the bipolar transistor, and additionally by the diode, so that the power semiconductor switch which is formed in this way allows a bidirectional current-flow direction. Furthermore, the first switching group system has at least one intermediate switching group, which is formed by two series-connected power semiconductor switches which can be driven and by a capacitor, with the or an intermediate switching group being connected to the first main switching group. Each of the power semiconductor switches which can be driven in the intermediate switching group is likewise formed by a bipolar transistor with an isolated drive electrode and by a diode which is connected back-to-back in parallel with the bipolar transistor. Furthermore, the first switching group system has a second main switching group which is formed by a power semiconductor switch, with the or an intermediate switching group being connected to the second main switching group. The power semiconductor switch in the second main switching group is also formed by a bipolar transistor with an isolated drive electrode, and by a diode which is connected back-to-back in parallel with the bipolar transistor. The power semiconductor switch in the second main switching group is thus also formed by an active electronic component which can be driven, specifically the bipolar transistor with an isolated drive electrode, and additionally by the diode, in which case the power semiconductor switch that is formed in this way likewise allows the already mentioned bidirectional current-flow direction.

The converter circuit according to WO 01/93412 A2 has the problem that the power semiconductor switch in the first main switching group and that in the second main switching group have a large number of electronic components, that is to say the power semiconductor switch is formed by the bipolar transistor with an isolated drive electrode and additionally by the diode. The large number of electronic components makes the design of the converter circuit complicated, causes high converter circuit costs and demands an enormous space requirement owing to the electronic components themselves and owing to their wiring. The use of the bipolar transistor with an isolated drive electrode in the semiconductor power switch in the first and in the second main switching groups furthermore makes it necessary to provide corresponding drive circuits, thus requiring a high level of drive complexity, with the wiring complexity being increased further and an additional space requirement being necessary, so that the costs for a converter circuit according to WO 01/93412 A2 rise further. The complicated design of the converter circuit with the large number of electronic components, the high level of drive complexity and the high level of wiring complexity mean that the converter circuit according to WO 01/93412 A2 is susceptible to defects, so that the overall availability of the converter circuit is poor. Furthermore, the bipolar transistor with an isolated drive electrode is an expensive electronic component which, by virtue of its design, is susceptible to defects, so that the availability of the converter circuit falls further.

Furthermore, the converter circuit according to WO 01/93412 A2 is uneconomic to operate in a large number of applications of the converter circuit, for example in the case of two-quadrant applications, since the bipolar transistor with an isolated drive electrode in the power semiconductor switch in the first and in the second main switching group is admittedly then driven but, in terms of current levels, it is not loaded at all, or is loaded only very lightly. US 2003/0128563 A1 discloses an alternative converter circuit for at least one phase, which converter circuit has a switching group system which is provided for a single one of these phases and has a first main switching group which is formed by a power semiconductor switch and by an associated capacitor which is connected to the power semiconductor switch, with the power semiconductor switch in the first main switching group being formed by a passive electronic component which cannot be driven and has a unidirectional current-flow direction. Furthermore, the switching group system has an intermediate switching group which is formed by two series-connected power semiconductor switches which can be driven and by a capacitor, with the intermediate switching group being connected to the first main switching group. Furthermore, the switching group system has a second main switching group, which is formed by a power semiconductor switch, with the power semiconductor switch in the second main switching group being formed by a passive electronic component which cannot be driven and has a unidirectional current-flow direction, and with the intermediate switching group or groups being connected to the second main switching group.

The converter circuit disclosed in US 2003/0128563 A1 has the problem that the capacitor in the first main switching group and the capacitor in the intermediate switching group 7 mean that the entire converter circuit can store only an extremely limited amount of electrical energy. This means that undesirable voltage oscillations and current oscillations occur on the two capacitors, which may be caused, for example, by a dynamic electrical load, and these voltage oscillations and current oscillations cannot be damped, because of the small storage capability of the capacitors. This means that harmonics occur on the phases of the converter circuit, which are extremely undesirable in an electrical AC voltage network which is normally connected to the phases.

DESCRIPTION OF THE INVENTION

One object of the invention is therefore to specify a converter circuit for at least one phase, in which as much electrical energy as possible can be stored. This object is achieved by the features of claim 1 and of claim 2. Advantageous developments of the invention are specified in the dependent claims.

The converter circuit according to the invention for at least one phase has a first switching group system for each phase, which first switching group system has a first main switching group which is formed by a power semiconductor switch and by a capacitor which is connected to the power semiconductor switch, with the power semiconductor switch in the first main switching group being formed by a passive electronic component which cannot be driven and has a unidirectional current-flow direction. Furthermore, the first switching group system has at least one intermediate switching group, which is formed by two series-connected power semiconductor switches which can be driven and by a capacitor, with the or an intermediate switching group being connected to the first main switching group.

The first switching group system also has a second main switching group which is formed by a power semiconductor switch, with the power semiconductor switch in the second main switching group being formed by a passive electronic component which cannot be driven and has a unidirectional current-flow direction, and the or an intermediate switching group is connected to the second main switching group. According to the invention, if there are a plurality of phases, the first switching group systems of the phases are connected in parallel with one another. As an alternative to this, according to the invention, n further switching group systems are provided for each phase, wherein n>1 and with each of the n further switching group systems in the intermediate switching group which is adjacent to the first main switching group is connected in series to the first main switching group and the intermediate switching group which is adjacent to the second main switching group is connected in series with the second main switching group. The first main switching group in the first switching group system and the first main switching groups in the n further switching group systems are connected in series with one another, in which the second main switching group in the first switching group system and the second main switching groups in the n further switching group systems are connected in series with one another. If there are a plurality of phases, the n-th further switching group systems for the phases are connected in parallel with one another. The parallel connection of the first switching group systems for the phases and of the n-th further switching group systems for the phases, that is to say of the capacitors in the first main switching groups in the first switching group systems and of the n-th further switching group systems as well as the capacitors in the intermediate switching groups in the first switching group systems and the n-th further switching group systems advantageously makes it possible to increase the amount of electrical energy which can be stored by the overall converter circuit, in particular because the capacitance values of the parallel-connected capacitors are added. Furthermore, the parallel connection of the capacitors in the first main switching groups and of the capacitors in the intermediate switching groups makes it possible to damp undesirable oscillations in the voltage and in the current on the parallel-connected capacitors in the first main switching groups and on the parallel-connected capacitors in the intermediate switching groups, and thus advantageously makes it possible to virtually avoid such oscillations. No such undesirable oscillations then occur, for a very large extent, on the phases in the converter circuit so that, in the end, virtually no such oscillations also occur in an electrical AC voltage network which is normally connected to the phases.

Since the power semiconductor switch in the first main switching group and the power semiconductor switch in the second main switching group are each formed by only one passive electronic component which cannot be driven and has a unidirectional current-flow direction, and thus in each case without any active electronic component which can be driven, as is also known from the prior art, for example a bipolar transistor with an isolated drive electrode, this results in a converter circuit which requires only a very small number of electronic components and is thus very simple and uncomplicated. Furthermore, the converter circuit according to the invention can also be produced and operated at low cost because of the small number of electronic components, while having a very low level of drive and wiring complexity, so that it requires little space and is distinguished by high reliability, and thus by high availability.

Furthermore, the converter circuit according to the invention can be operated very economically since the power semiconductor switch, which is in the form of a passive electronic component which cannot be driven and has a unidirectional current-flow direction, in the first and second main switching groups is involved in carrying the current during operation of the converter circuit and thus very largely has the load removed from it.

These and further objects, advantages and features of the present invention will become clear from the following detailed description of preferred embodiments of the invention, in conjunction with the drawing.

Figure 1:
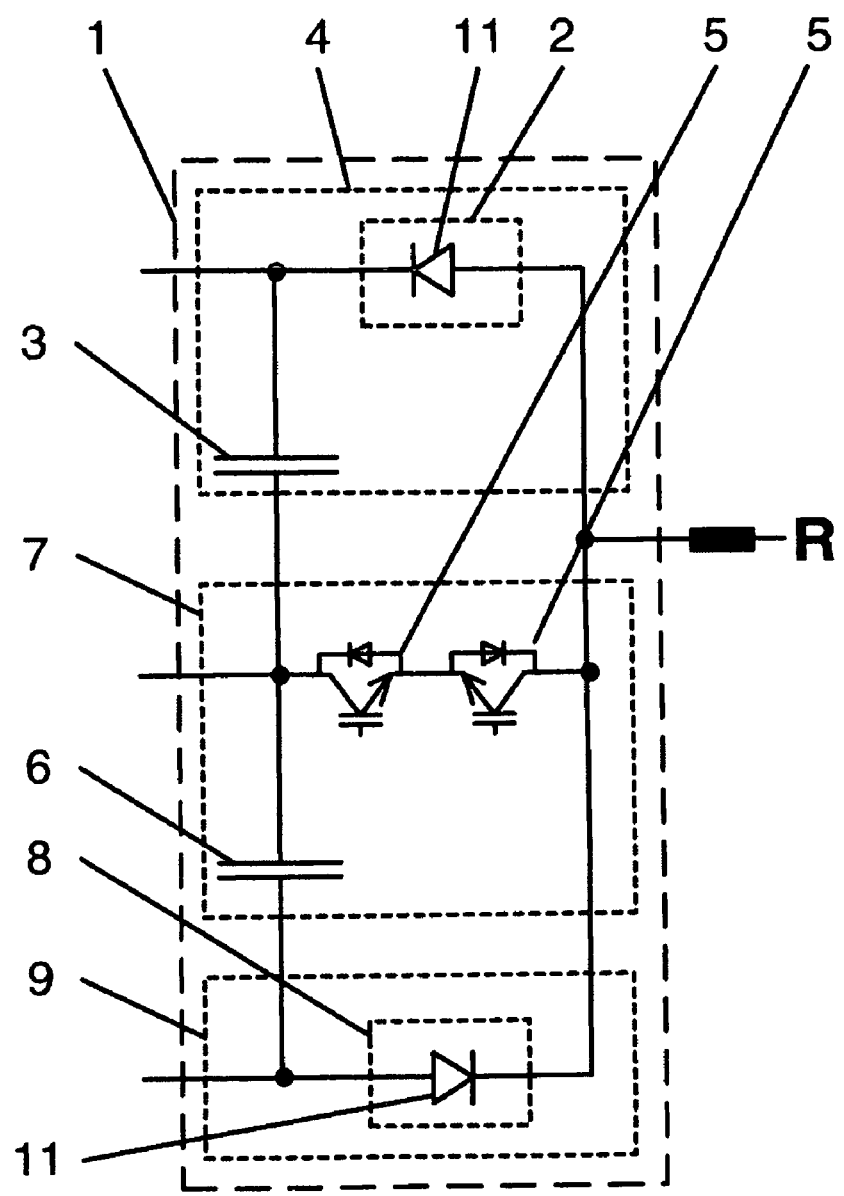
FIG. 1 shows a first embodiment of a converter circuit according to the invention.

The reference symbols used in the drawing and their meaning are listed in summarized form in the list of reference symbols. In principle, identical parts are provided with the same reference symbols in the figures. The described embodiments represent examples of the subject matter of the invention and have no restrictive effect.

APPROACHES TO IMPLEMENTATION OF THE INVENTION

FIG. 1 shows a first embodiment, in particular a single-phase embodiment, of a converter circuit according to the invention. In this case, the converter circuit comprises, for at least one phase R, Y, B, a first switching group system 1 which is provided for each phase R, Y, B and has a first main switching group 4 which is formed by a power semiconductor switch 2 and by a capacitor 3 which is connected to the power semiconductor switch 2. The first switching group system 1 also has at least one intermediate switching group 7 which is formed by two series-connected power semiconductor switches 5 which can be driven and by a capacitor 6, with the or an intermediate switching group 7 being connected to the first main switching group 4. The two series-connected power semiconductor switches 5 which can be driven in the intermediate switching group 7 are, as can be seen from FIG. 1, each in the form of bipolar transistors with isolated drive electrodes and diodes connected back-to-back in parallel. Furthermore, the first switching group system 1 has a second main switching group 9 which is formed by a power semiconductor switch 8, with the or an intermediate switching group 7 being connected to the second main switching group 9. The power semiconductor switch 2 in the first main switching group 4 is formed by a passive electronic component 11 which cannot be driven and has a unidirectional current-flow direction, and the power semiconductor switch 8 in the second main switching group 9 is likewise formed by a passive electronic component 11 which cannot be driven and has a unidirectional current-flow direction.

The converter circuit according to the invention therefore does not require a known active electronic component which can be driven, for example a bipolar transistor with an isolated drive electrode, for the first and the second main switching groups 4, 9, since the power semiconductor switch 2 in the first main switching group 4 and the power semiconductor switch 8 in the second main switching group 8 are each formed by only a passive electronic component 11 which cannot be driven and has a unidirectional current-flow direction. This measure results in a converter circuit which requires a very small number of electronic components and is thus very simple and uncomplicated. Furthermore, the converter circuit according to the invention can be produced and operated at low cost because of the small number of electronic components, has a very low level of drive and wiring complexity, and thus requires only a small amount of space and is distinguished by high reliability and thus by high availability.

Furthermore, the converter circuit according to the invention can be operated very economically since the power semiconductor switches 2, 8, which are in the form of passive electronic components 11 which cannot be driven and have a unidirectional current-flow direction, in the first and in the second main switching groups 4, 9 are involved in carrying the current during operation of the converter circuit, thus reducing the load to a major extent.

The converter circuit according to the invention can be used and operated for two-quadrant operation as a rectifier and as a phase shifter, for example for power-factor correction. The converter circuit according to the invention is preferably used with a three-phase, low-cost standard transformer on the phase side instead of 12-pulse, 18-pulse or 24-pulse rectifier circuits with complex special transformers.

Figure 2:
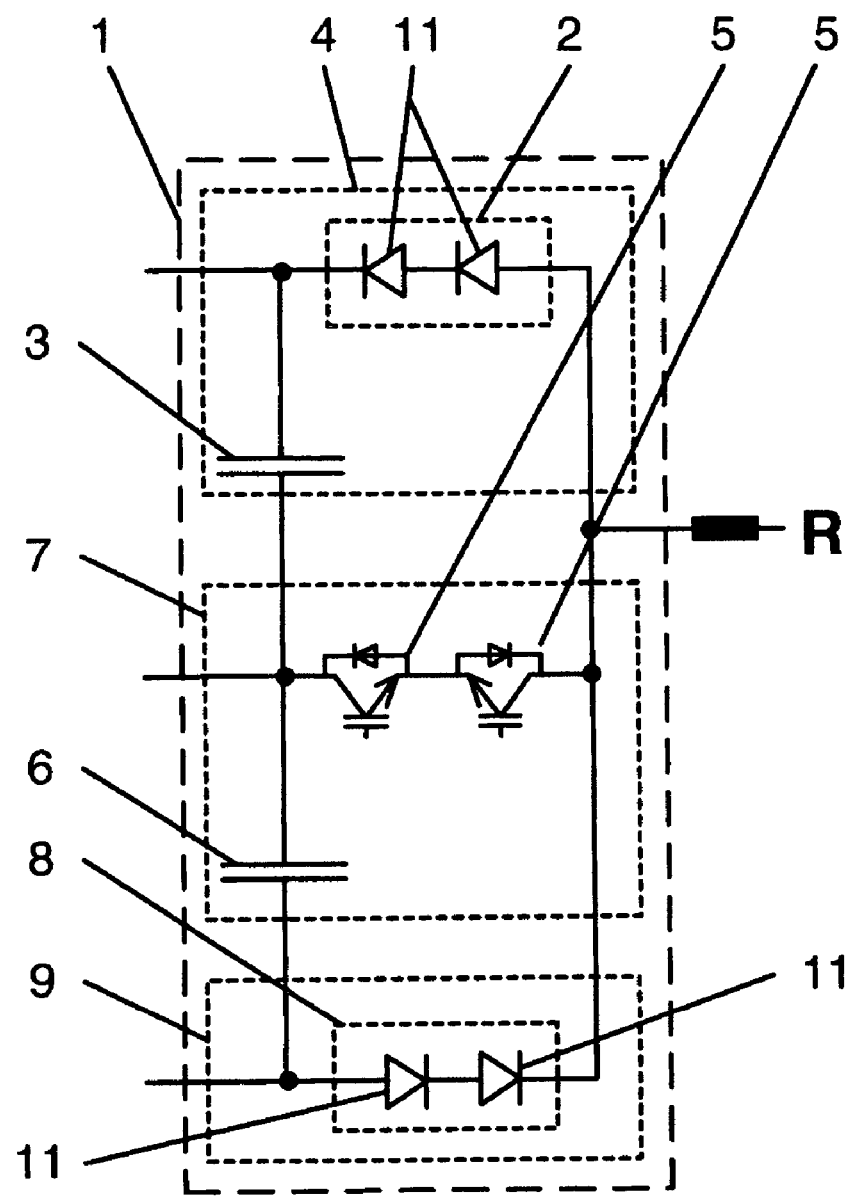
FIG. 2 shows a second embodiment of the converter circuit according to the invention.

FIG. 2 shows a second embodiment of the converter circuit according to the invention in which, in the case of the first switching group system 1, the power semiconductor switch 2 in the first main switching group 4 has a further passive electronic component 11 which cannot be driven and has a unidirectional current-flow direction, with the further electronic component 11 being connected in series with the existing electronic component 11. Furthermore, as can be seen from FIG. 2, in the case of the first switching group system 1, the power semiconductor switch 8 in the second main switching group 9 likewise has a further passive electronic component 11 which cannot be driven and has a unidirectional current-flow direction, with the further electronic component 11 being connected in series with the existing electronic component 11. The existing passive electronic component 11 and the further passive electronic component 11 which cannot be driven are preferably in the form of a diode in each case, as can be seen in FIG. 1 and FIG. 2, respectively. In FIG. 1, the diode is in the form of a high blocking-capability diode, that is to say a diode with a high reverse voltage. The series circuit formed by the existing passive electronic component 11 which cannot be driven and has a unidirectional current-flow direction and the further passive electronic component 11 which cannot be driven and has a unidirectional current-flow direction in the first and the second main switching groups 4, 9 as shown in FIG. 2 also results in the voltage being split between the two electronic components 11, thus making it possible to achieve a higher overall blocking capability with the converter circuit according to the invention, so that more power can be transmitted through the converter circuit according to the invention.

Figure 3:
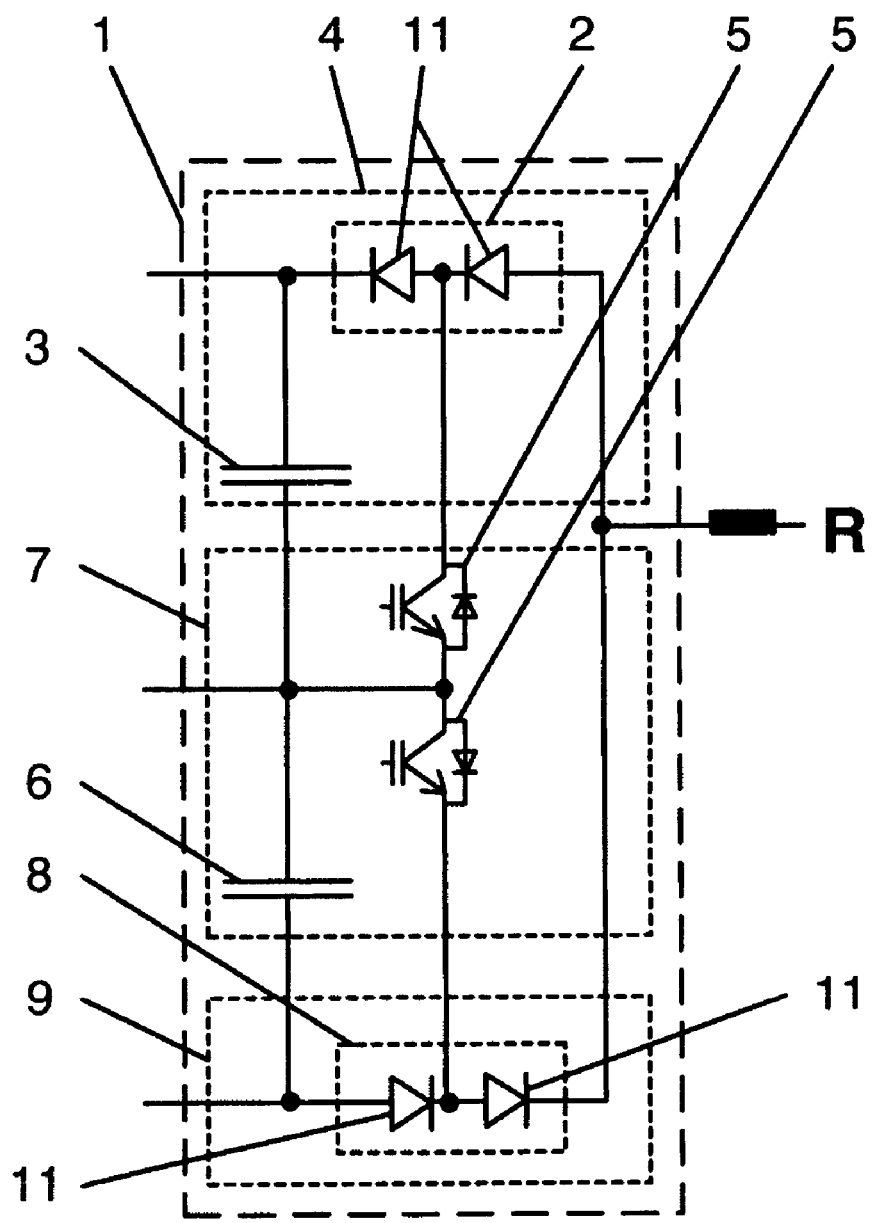
FIG. 3 shows a third embodiment of the converter circuit according to the invention.

In the embodiments of the converter circuit according to the invention as shown in FIG. 1 and FIG. 2, in the case of the first switching group system 1, one of the power semiconductor switches 5 which can be driven in each intermediate switching group 7 is connected to the capacitor 6 in the same intermediate switching group 7. Furthermore, the intermediate switching group 7 which is adjacent to the first main switching group 4 is connected in parallel with the first main switching group 4, and the intermediate switching group 7 which is adjacent to the second main switching group 9 is connected in parallel with the second main switching group 9. In contrast to the two embodiments of the converter circuit according to the invention shown in FIG. 1 and FIG. 2, in the case of a third embodiment of the converter circuit according to the invention as shown in FIG. 3, the junction point of the two power semiconductor switches 5 which can be driven in each intermediate switching group 7 in the first switching group system 1 is connected to the capacitor 6 in the same intermediate switching group 7, with the intermediate switching group 7 which is adjacent to the first main switching group 4 and has one of the two power semiconductor switches 5 which can be driven being connected to the junction point between the two electronic components 11 in the first main switching group 4. Furthermore, as can be seen from FIG. 3, in the case of the first switching group system 1, the intermediate switching group 7 which is adjacent to the second main switching group 9 and has the other of the two power semiconductor switches 5 which can be driven is connected to the junction point between the two electronic components 11 in the second main switching group 9.

Figure 4:
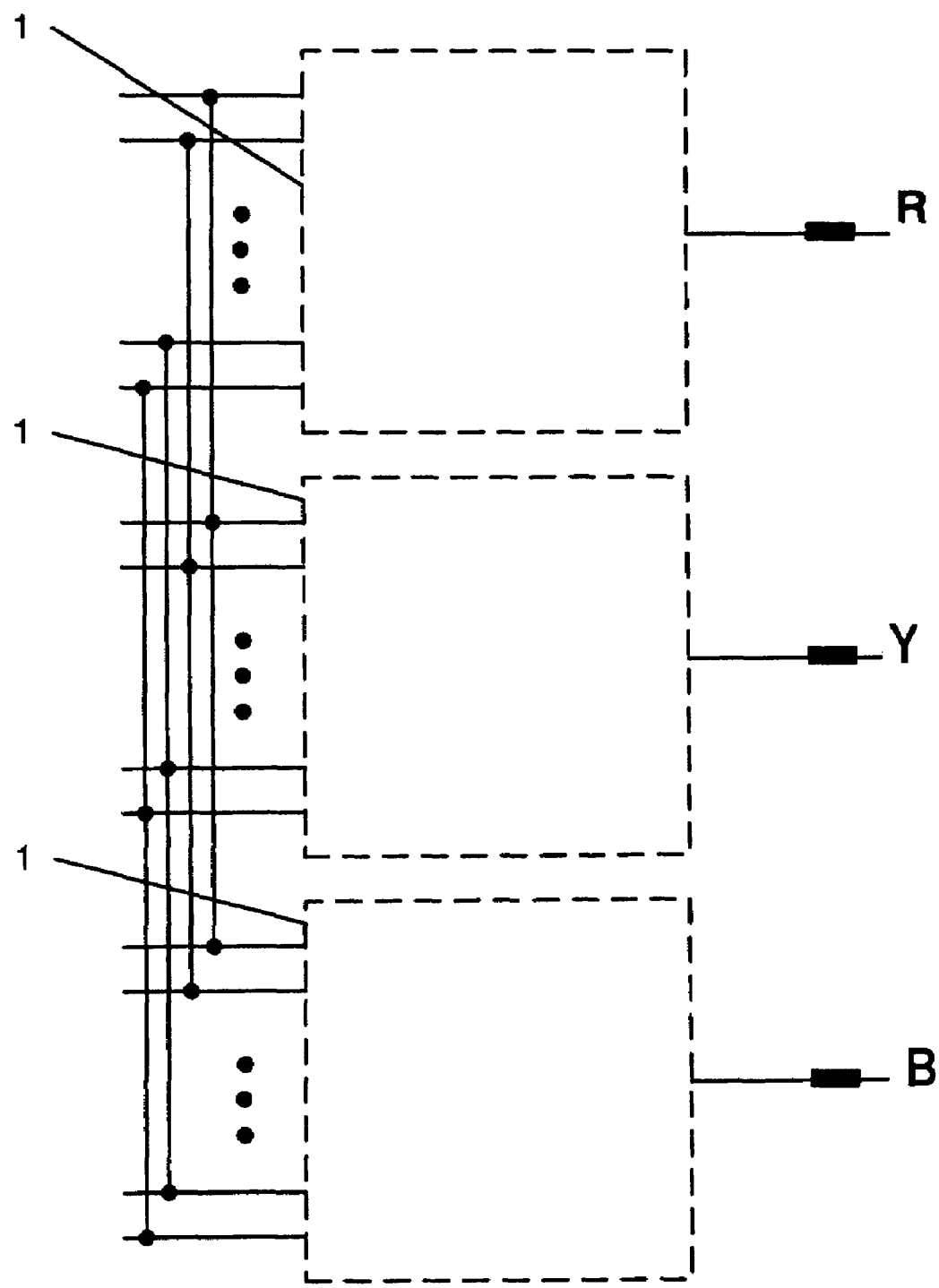
FIG. 4 shows a fourth embodiment of the converter circuit according to the invention.
Figure 10:
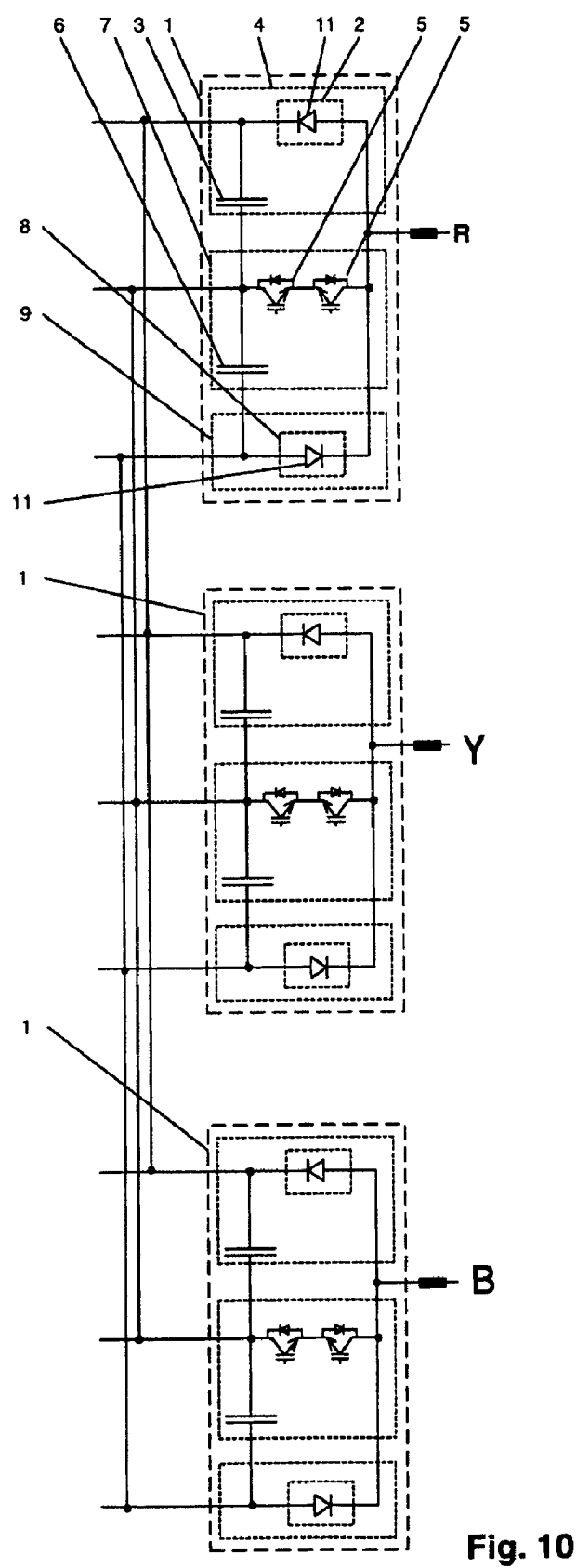
FIG. 10 shows an illustration of an example of the fourth embodiment as shown in FIG. 4 of the converter circuit according to the invention.

FIG. 4 shows a fourth embodiment of the converter circuit according to the invention, in which, when there are a plurality of phases R, Y, B, in particular when there are three phases R, Y, B as shown in FIG. 4, the first switching group systems 1 for the phases R, Y, B are connected to one another in parallel, that is to say the capacitors 3 in the first main switching groups 4 in the first switching group systems 1 for the phases R, Y, B are connected to one another in parallel, and the capacitors 6 in the intermediate switching groups 7 in the first switching group systems 1 for the phases R, Y, B are connected to one another in parallel. As can be seen from FIG. 4, the second main switching groups 9 in the first switching group systems 1 are also connected to one another. In order to make it easy to understand this, FIG. 10 shows an illustrative example of the fourth embodiment as shown in FIG. 4 of the converter circuit according to the invention with first switching group systems 1 as shown in FIG. 1. The amount of electrical energy which can be stored in the overall converter circuit is advantageously increased by means of the parallel connection of the first switching group systems 1 for the phases R, Y, B, that is to say of the capacitors 3 in the first main switching groups 4 and of the capacitors 6 in the intermediate switching groups 7. Furthermore, the parallel connection of the capacitors 3 in the first main switching groups 4 and of the capacitors 6 in the intermediate switching groups 7 damps undesirable oscillations of the voltage and of the current on the parallel-connected capacitors 3 in the first main switching groups 4 and on the parallel-connected capacitors 6 in the intermediate switching groups 7, thus advantageously very largely avoiding such oscillations. No such undesirable oscillations then also occur, very largely, in the phases R, Y, B of the converter circuit and thus, in the end, there are also virtually no such oscillations in an electrical AC voltage network which is normally connected to the phases. Furthermore, if an electrical device, for example a charging device, is connected to one of the capacitors 3 in the first main switching groups 4 or to one of the capacitors 6 in the intermediate switching groups 7 in such a way that all the capacitors 3 in the first main switching groups 4 and all of the capacitors 6 in the intermediate switching groups 7 are connected to the electrical device, then this means that there is no need for a single connection of the electrical device to each of the capacitors in the first main switching groups 4 and to each of the capacitors 6 in the intermediate switching groups 7.

As already mentioned above, in the case of the first switching group system 1 in the converter circuit according to the invention, at least one intermediate switching group 7, that is to say one or more intermediate switching groups 7, is or are provided. According to the embodiments of the converter circuit according to the invention illustrated in FIG. 5, FIG. 6 and FIG. 9, which will be explained in detail in the following text, respectively adjacent intermediate switching groups 7 are connected to one another in a chain when a plurality of intermediate switching groups 7 are provided in the first switching group system 1, with the intermediate switching groups 7 being designed in accordance with the embodiment shown in FIG. 1 or FIG. 2. The intermediate switching groups 7 shown in FIG. 1 or FIG. 2 is a four-pole network, so that the chain of respectively adjacent intermediate switching groups 7 is a chain of four-pole networks. It is self-evident that the chain mentioned above formed from respectively adjacent intermediate switching groups 7 in the first switching group system 1 can also be formed with the intermediate switching groups 7, designed as shown in FIG. 3, in the first switching group system 1. The large number of intermediate switching groups 7 in the first switching group system 1 means that the power which can be transmitted can be increased by increasing the DC voltage which is applied to the first switching group system 1, since this DC voltage is split into individual DC voltages, corresponding to the capacitor 3 in the associated first main switching group 4 and the capacitors 6 in the large number of intermediate switching groups 7. Furthermore, this large number results in an increase in the number of switching levels, thus highly advantageously making it possible to further reduce harmonics on the phase side of the converter circuit.

Figure 5:
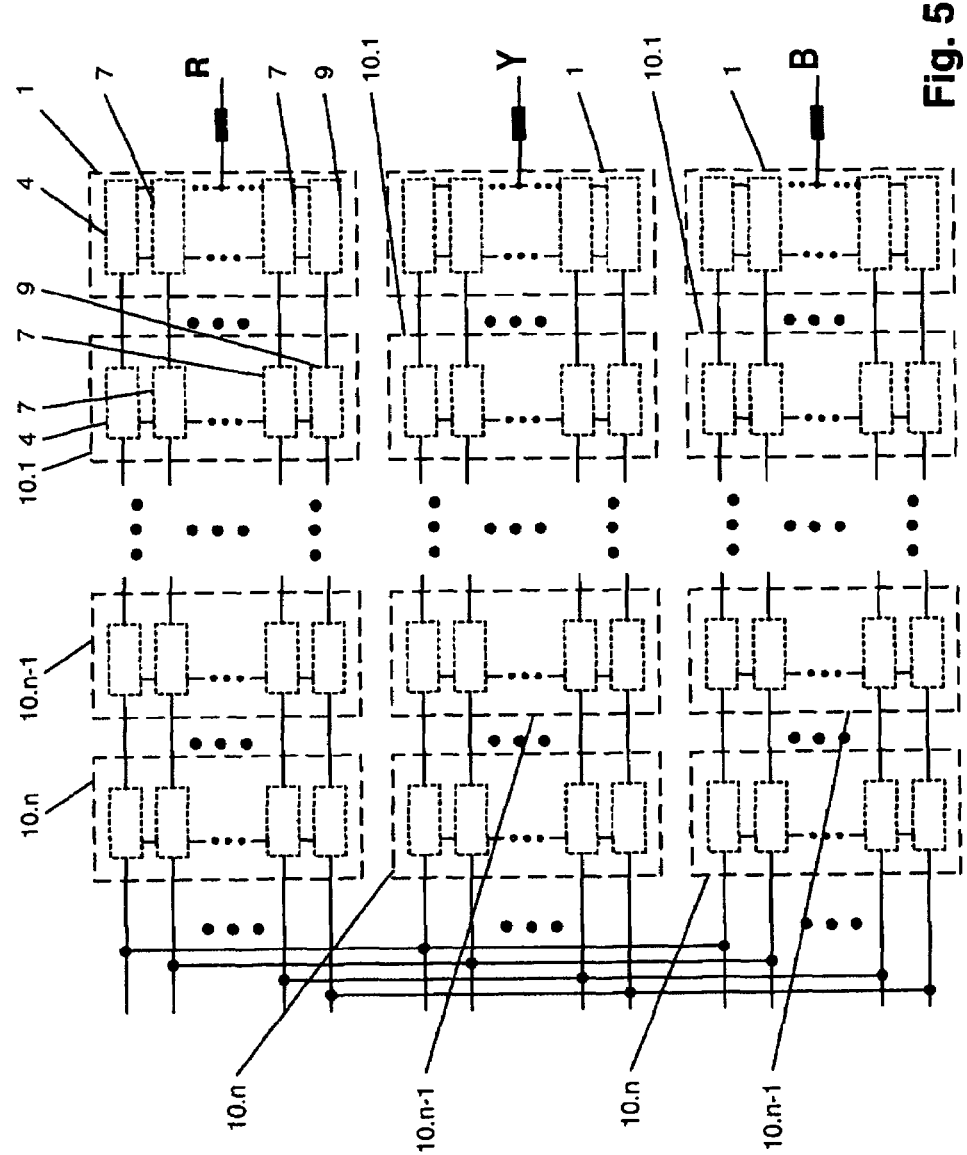
FIG. 5 shows a fifth embodiment of the converter circuit according to the invention.
Figure 6:
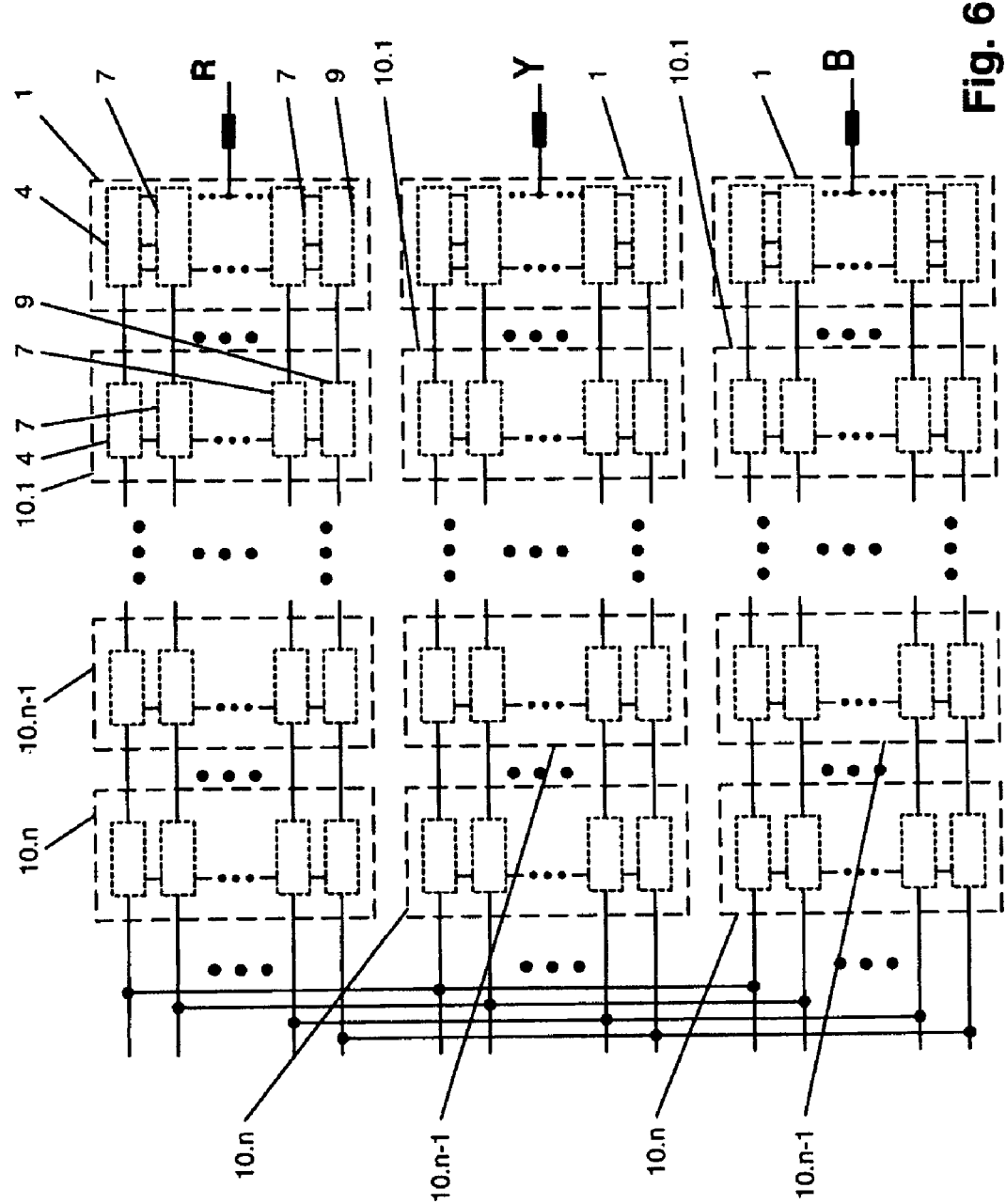
FIG. 6 shows a sixth embodiment of the converter circuit according to the invention.

FIG. 5 shows a fifth embodiment of the converter circuit according to the invention, in which the first switching group systems 1 for the phases R, Y, B are formed with the corresponding first and second main switching groups 4, 9 and with a plurality of intermediate switching groups 7 as shown in FIG. 1 or FIG. 2. Furthermore, FIG. 6 shows a sixth embodiment of the converter circuit according to the invention, in which the first switching group systems 1 for the phases R, Y, B are formed with a corresponding first and second main switching groups 4, 9 and with a plurality of intermediate switching groups 7 as shown in FIG. 3. In the case of the fifth embodiment as shown in FIG. 5 and in the case of the sixth embodiment as shown in FIG. 6, there are three phases, by way of example, although any desired number of phases R, Y, B is generally feasible. As can be seen from FIG. 5 and FIG. 6, n further switching group systems 10.1, ... 10.n are provided for each phase R, Y, B, where $n \geq 1$ and, in the case of each of the n further switching group systems 10.1, ... 10.n, one of the power semiconductor switches 5 which can be driven in each intermediate switching group 7 is connected to the capacitor 6 in the same intermediate switching group 7, and the intermediate switching group 7 which is adjacent to the first main switching group 4 is connected in series with the first main switching group 4, and the intermediate switching group 7 which is adjacent to the second main switching group 9 is connected in series with the second main switching group 9. Furthermore, as can be seen from FIG. 5 and FIG. 6, the first main switching group 4 in the first switching group system 1 and the first main switching groups 4 in the n further switching group systems 10.1, ... 10.n are connected in series with one another, and the second main switching group 9 in the first switching group system 1 and the second main switching groups 9 in the n further switching group systems 10.1, ... 10.n are connected in series with one another. Each of the n further switching group systems 10.1, ... 10.n for the phases R, Y, B is preferably designed on the basis of the first switching group system 1 as described above and as shown in FIG. 1 or FIG. 2 with respect to the first and the second main switching groups 4, 9 and the intermediate switching group or groups 7, that is to say, in general, each of the n further switching group systems 10.1, ... 10.n for the phases R, Y, B has the first main switching group 4 which is formed by a power semiconductor switch 2 and by a capacitor 3 which is connected to the power semiconductor switch 2, with the power semiconductor switch 2 in the first main switching group 4 being formed by a passive electronic component 11, which cannot be driven and has a unidirectional current-flow direction. Furthermore, each of the n further switching group systems 10.1, ... 10.n for the phases R, Y, B has at least one intermediate switching group 7 which is formed by two series-connected power semiconductor switches 5 which can be driven and by a capacitor 6, with the or an intermediate switching group 7 being connected to the first main switching group 4. Furthermore, each of the n further switching group systems 10.1, ... 10.n for the phases R, Y, B has the second main switching group 9 which is formed by a power semiconductor switch, with the power semiconductor switch 8 in the second main switching group 9 being formed by a passive electronic component 11 which cannot be driven and has a unidirectional current-flow direction, and the or an intermediate switching group 7 being connected to the second main switching group 9. In a similar way to that shown in FIG. 4, in the case of the fifth and sixth embodiments of the converter circuit according to the invention as shown in FIG. 5 and FIG. 6, when there are a plurality of phases R, Y, B, the n-th further switching group systems 10.n for the phase R, Y, B are connected to one another in parallel, that is to say the capacitors 3 in the first main switching groups 4 in the n-th further switching group systems 10.n are connected to one another in parallel, and the capacitors 6 in the intermediate switching groups 7 in the n-th further switching group systems 10.n are connected to one another in parallel. As can be seen from FIG. 5 and FIG. 6, the second main switching groups 9 in the n-th further switching group systems 10.n are also connected to one another. The parallel connection of the n-th further switching group systems 10.n for the phases R, Y, B, that is to say of the capacitors 3 in the first main switching groups 4 and of the capacitors 6 in the intermediate switching groups 7, advantageously results in an increase in the amount of electrical energy which can be stored in the overall converter circuit. Furthermore, the parallel connection of the capacitors 3 in the first main switching groups 4 and of the capacitors 6 in the intermediate switching groups 7 damps undesirable oscillations in the voltage and in the current on the parallel-connected capacitors 3 in the first main switching groups 4 and on the parallel-connected capacitors 6 in the intermediate switching groups 7, thus advantageously very largely avoiding them. No such undesirable oscillations then occur either, to a very large extent, in the phases R, Y, B in the converter circuit, and thus, in the end, virtually no such oscillations occur in an electrical AC voltage network which is normally connected to the phases. Furthermore, if an electrical device, for example a charging device, is connected to one of the capacitors 3 in the first main switching groups 4 or to one of the capacitors 6 in the intermediate switching groups 7, so that all of the capacitors 3 in the first main switching groups 4 or all of the capacitors 6 in the intermediate switching groups 7 are connected to the electrical device, then this advantageously makes it possible to avoid a single connection of the electrical device to each of the capacitors in the first main switching groups 4 and to each of the capacitors 6 in the intermediate switching groups 7.

Figure 7:
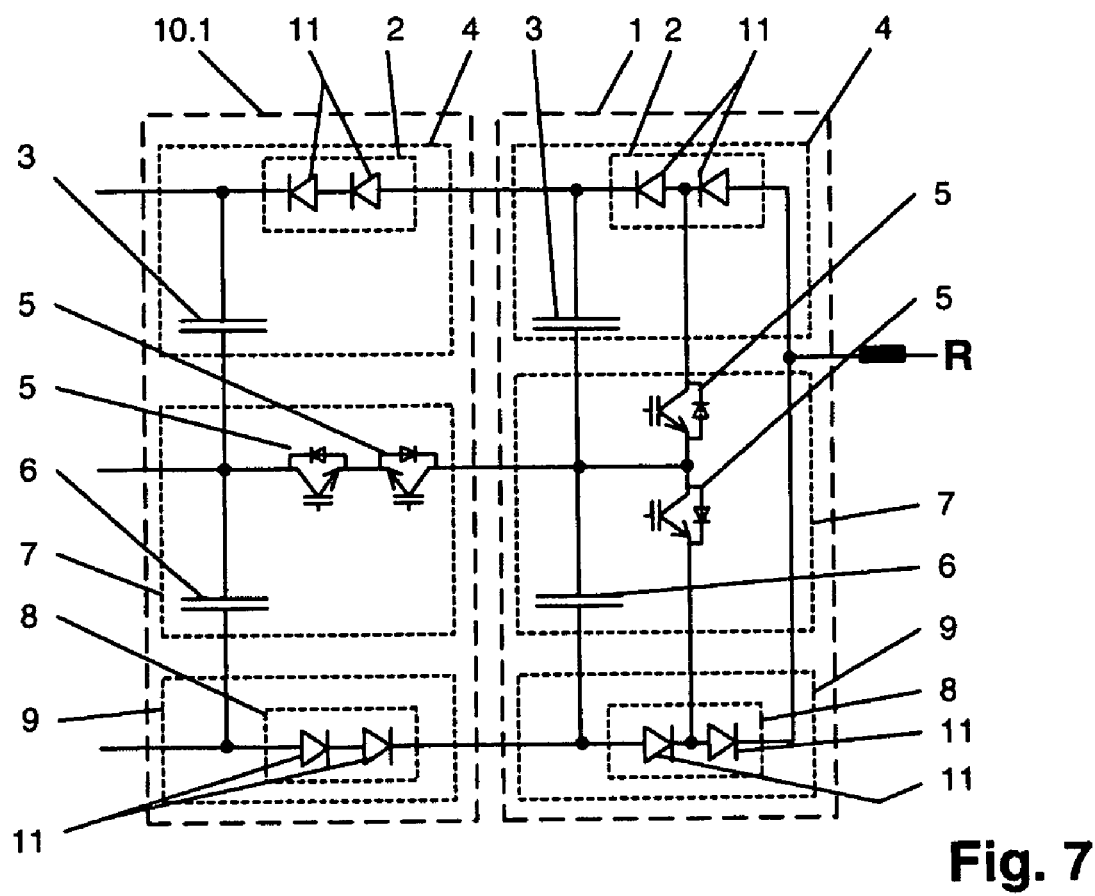
FIG. 7 shows a seventh embodiment of the converter circuit according to the invention.
Figure 8:
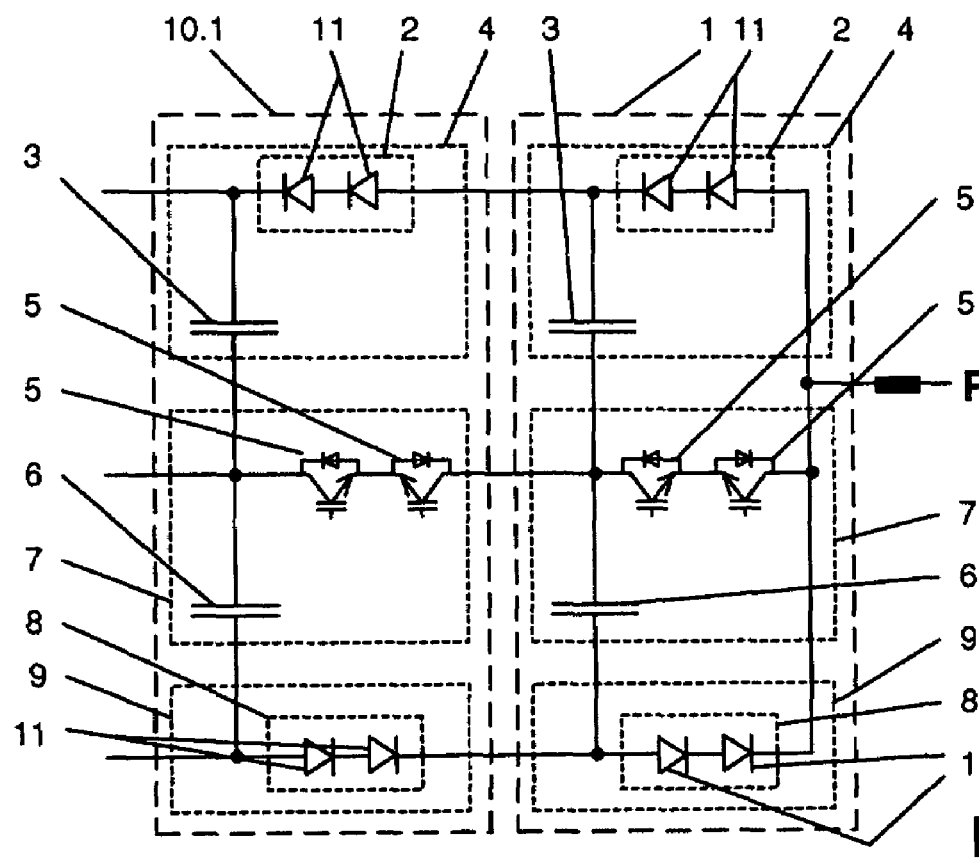
FIG. 8 shows an eighth embodiment of the converter circuit according to the invention.

The provision of n further switching group systems 10.1, . . . 10.n for each phase R, Y, B as shown in FIG. 5 and FIG. 6 advantageously halves the DC voltages of the capacitors 3, 6 in the respective n-th switching group systems 10.n on the capacitors 3, 6 in the downstream (n−1)-th switching group system 10.n−1 during operation of the converter circuit according to the invention. If there are n=1 further switching group systems 10.1, . . . 10.n, as is shown by way of example in a seventh, in particular single-phase, embodiment of the converter circuit as shown in FIG. 7 and in an eighth, in particular likewise single-phase, embodiment of the converter circuit as shown in FIG. 8, in each case half of the DC voltage of the capacitor 3 in the first main switching group 4 in the first further switching group system 10.1 and of the capacitor 6 in the intermediate switching group 7 in the first further switching group system 10.1 is accordingly applied during operation of the converter circuit to the capacitor 3 in the first main switching group 4 in the first switching group system 1 and to the capacitor 6 in the intermediate switching group 7 in the first switching group system 1. This halving of the DC voltage advantageously reduces the load on the power semiconductor switches 2, 5, 8 and on the capacitors 3, 6 in the first switching group system 1. In general, this allows a large number of switching levels to be generated, thus highly advantageously making it possible to achieve an effective reduction in the harmonics on the phase side. As can be seen from FIG. 7, the first switching group system 1 corresponds to the switching group system 1 as described in detail above and as shown in FIG. 3. Furthermore, the first further switching group system 10.1 as shown in FIG. 7 corresponds to the switching group system 1 as described in detail above and as shown in FIG. 2, although it is, of course, also feasible for the first further switching group system 10.1 as shown in FIG. 7 to be designed in the same way as the switching group system 1 as described above in detail and as shown in FIG. 1. As can be seen from FIG. 8, the first switching group system 1 and the first further switching group system 10.1 correspond to the switching group system 1 as described in detail above and as shown in FIG. 2, although, of course, it is also feasible for the first switching group system 1 and the first further switching group system 10.1 as shown in FIG. 7 to be designed in the same way as the switching group system 1 as described in detail above and as shown in FIG. 1.

Figure 9:
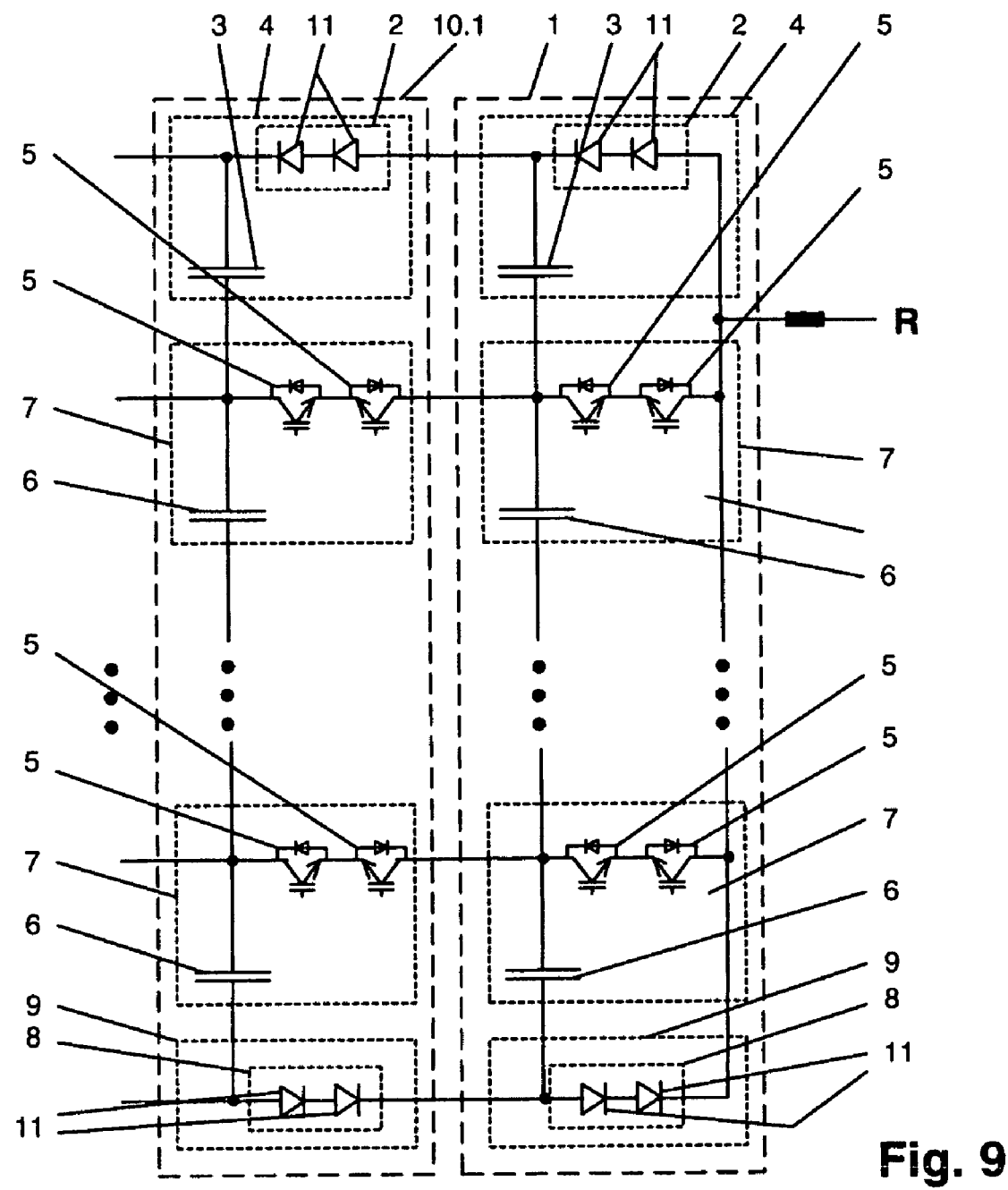
FIG. 9 shows a ninth embodiment of the converter circuit according to the invention.

As can be seen from the fifth and sixth embodiments of the converter circuit according to the invention as shown in FIG. 5 and FIG. 6, the number of intermediate switching groups 7 in each switching group system 10.1, . . . 10.n in the n further switching group systems 10.1, . . . 10.n corresponds to the number of intermediate switching groups 7 in the first switching group system 1, with respectively adjacent intermediate switching groups 7 being connected to one another in series in each in each of the n further switching group systems 10.1, . . . 10.n when a plurality of intermediate switching groups 7 are provided. Furthermore, as can be seen from FIGS. 5 and 6 and according to a ninth embodiment of the converter circuit according to the invention as shown in FIG. 9, each intermediate switching group 7 in the first further switching group system 10.1 is connected in series with in each case one intermediate switching group 7 in the first switching group system 1. By way of example, n=1 in the ninth embodiment of the converter circuit according to the invention as shown in FIG. 9, in which case, in particular, the converter circuit is designed for a single phase. As can be seen from FIG. 9, the first switching group system 1 and the first further switching group system 10.1 correspond to the switching group system 1 as described in detail above and as shown in FIG. 2 with a plurality of intermediate switching groups 7, although, of course, it is also feasible for the first switching group system 1 and the first further switching group system 10.1 as shown in FIG. 9 to be designed in the same way as the switching group system 1 as described in detail above and as shown in FIG. 1, with a plurality of intermediate switching groups 7. Furthermore, it is also possible for the first switching group system 1 as shown in FIG. 9 to be designed in the same way as the switching group system 1 as described in detail above and as shown in FIG. 3 with a plurality of intermediate switching groups 7, and for the first further switching group system 10.1 as shown in FIG. 9 to be designed in the same way as the switching group system 1 as described in detail above and as shown in FIG. 1 with a plurality of intermediate switching groups 7.

If $n \geq 2$, corresponding to the fifth and sixth embodiments of the converter circuit as shown in FIG. 5 and FIG. 6, each intermediate switching group 7 in the n-th further switching group system 10.2, ... 10.n is connected in series to in each case one intermediate switching group 7 in the (n−1)-th switching group system 10.2, ... 10.n. The advantage that, in general, the number of intermediate switching groups 7 in each switching group system 10.1, ... 10.n in the n further switching group systems 10.1, ... 10.n corresponds to the number of intermediate switching groups 7 in the first switching group system 1 is that this makes it possible to achieve a balanced and, furthermore, modular design of the converter circuit, so that the converter circuit can be adapted easily and quickly, and can thus be matched to widely differing circuit requirements. Furthermore, the large number of intermediate switching groups 7 for each switching group system 1, 10.1, ... 10.n shown in FIG. 5, FIG. 6 and FIG. 9 make it possible to increase the amount of power which can be transmitted by applying a greater DC voltage to the respective n-th switching group systems 10.n, since this DC voltage is split into individual DC voltages corresponding to the capacitor 3 in the associated first main switching group 4 and to the capacitors 6 in the large number of intermediate switching groups 7. Furthermore, this large number results in an increase in the number of switching levels, thus highly advantageously making it possible to achieve a further reduction in the harmonics on the phase side of the converter circuit.

As has already been explained, the power semiconductor switches 5 which can be driven in the intermediate switching group 7 according to the embodiments of the converter circuit shown in FIG. 1 to FIG. 10, are in the form of bipolar transistors with isolated drive electrodes and diodes connected back-to-back in parallel. These bipolar transistors mean that it is advantageously possible by appropriately driving the bipolar transistors, that is to say when the bipolar transistors are switched on, to limit in a controlled manner the current gradient di/dt in the diode in the first and/or in the second main switching groups 4, 9 as shown in FIG. 1 and FIG. 10, and/or the diodes in the first and/or the second main switching groups 4, 9 as shown in FIG. 2, FIG. 3, FIG. 7, FIG. 8 and FIG. 9, and thus advantageously to protect the respective diode against being damaged or even destroyed.

Overall, the converter circuit according to the invention represents a solution which is characterized by a small number of components and is thus uncomplicated, robust and reliable, with the capability to transmit high power levels at the same time.

LIST OF REFERENCE SYMBOLS

1 First switching group system
2 Power semiconductor switch in the first main switching group
3 Capacitor in the first main switching group
4 First main switching group
5 Power semiconductor switch which can be driven in the intermediate switching group
6 Capacitor in the intermediate switching group
7 Intermediate switching group
8 Power semiconductor switch in the second main switching group
9 Second main switching group 10.1, ... 10.n Further switching group systems
11 Passive electronic component which cannot be driven

The invention claimed is:

1. A converter circuit for a plurality of phases (R, Y, B), having a first switching group system which is provided for each phase (R, Y, B), and having a further or n further switching group systems, where n>1, which are provided for each phase (R, Y, B),
wherein each switching group system has a first main switching group which is formed by a power semiconductor switch and by a separate capacitor which is connected to the power semiconductor switch, with the power semiconductor switch in the first main switching group being formed exclusively by a passive electronic component which cannot be driven and has a unidirectional current-flow direction, and each switching group system has at least one intermediate switching group, which is formed by two series-connected power semiconductor switches which can be driven and by a separate capacitor, with the intermediate switching group or one of the intermediate switching groups being connected to the first main switching group,
and each switching group system has a second main switching group which is formed by a power semiconductor switch, with the power semiconductor switch in the second main switching group being formed exclusively by a passive electronic component which cannot be driven and has a unidirectional current-flow direction, and an intermediate switching group is connected to the second main switching group,
wherein
in case of the further or each of the n further switching group system or systems, the intermediate switching group which is adjacent to the first main switching group is connected in series with the first main switching group, and the intermediate switching group which is adjacent to the second main switching group is connected in series with the second main switching group,
wherein the first main switching group in the first switching group system and the first main switching groups in the further or n further switching group system or systems are connected to one another in series,
wherein the second main switching group in the first switching group system and the second main switching groups in the further or the n further switching group system or systems are connected to one another in series,
wherein, if there are a plurality of phases (R, Y, B), the further switching group systems or the n-th further switching group systems in the phases are connected to one another in parallel,
wherein, in the case of the first switching group system, and in the case of the further or in the case of each of the n further switching group systems, one of the power semiconductor switches which can be driven in each intermediate switching group is connected to the capacitor in the same intermediate switching group,
wherein, in the case of the first switching group system, the intermediate switching group which is adjacent to the first main switching group is connected in parallel with the first main switching group, and
wherein, in the case of the first switching group system, the intermediate switching group which is adjacent to the second main switching group is connected in parallel with the second main switching group.

2. A converter circuit for a plurality of phases (R, Y, B), having a first switching group system which is provided for each phase (R, Y, B), and having a further or n further switching group systems, where n>1, which are provided for each phase (R, Y, B), wherein each switching group system has a first main switching group which is formed by a power semiconductor switch and by a separate capacitor which is connected to the power semiconductor switch, with the power semiconductor switch in the first main switching group being formed exclusively by a passive electronic component which cannot be driven and has a unidirectional current-flow direction, which switching group system in each case has at least one intermediate switching group, which is formed by two series-connected power semiconductor switches which can be driven and by a separate capacitor, with the intermediate switching group or one of the intermediate switching groups being connected to the first main switching group, and each switching group system has a second main switching group which is formed by a power semiconductor switch, with the power semiconductor switch in the second main switching group being formed exclusively by a passive electronic component which cannot be driven and has a unidirectional current-flow direction, and the or an intermediate switching group is connected to the second main switching group, wherein in case of the further or each of the n further switching group system or systems, the intermediate switching group which is adjacent to the first main switching group is connected in series with the first main switching group, and the intermediate switching group which is adjacent to the second main switching group is connected in series with the second main switching group, wherein the first main switching group in the first switching group system and the first main switching groups in the further or n further switching group system or systems are connected to one another in series, wherein the second main switching group in the first switching group system and the second main switching groups in the further or the n further switching group system or systems are connected to one another in series, wherein, if there are a plurality of phases (R, Y, B), the further switching group systems or the n-th further switching group systems in the phases (R, Y, B) are connected to one another in parallel, wherein, in the case of the first switching group system and in the case of each of the n further switching group systems, the power semiconductor switch in the first main switching group has a further passive electronic component which cannot be driven and has a unidirectional current-flow direction, with the further electronic component being connected in series with the existing electronic component, wherein, in the case of the first switching group system and in the case of each of the n further switching group systems, the power semiconductor switch in the second main switching group has a further passive electronic component which cannot be driven and has a unidirectional current-flow direction, with the further electronic component being connected in series with the existing electronic component, wherein, in the case of the first switching group system, the junction point between the two power semiconductor switches which can be driven in each intermediate switching group is connected to the capacitor in the same intermediate switching group, wherein, in the case of the first switching group system, the intermediate switching group which is adjacent to the first main switching group and has one of the two power semiconductor switches which can be driven is connected to the junction point between the two electronic components in the first main switching group, and wherein, in the case of the first switching group system, the intermediate switching group which is adjacent to the second main switching group and has the other of the two power semiconductor switches which can be driven is connected to the junction point between the two electronic components in the second main switching group.

3. The converter circuit as claimed in claim 1, wherein, in the first switching group system, and in the case of the further or in the case of each of the n further switching group system or systems, the power semiconductor switch in the first main switching group has a further passive electronic component which cannot be driven and has a unidirectional current-flow direction, with the further electronic component being connected in series with the existing electronic component, and wherein, in the case of the first switching group system, and in the case of the further or in the case of each of the n further switching group system or systems, the power semiconductor switch in the second main switching group has a further passive electronic component which cannot be driven and has a unidirectional current-flow direction, with the further electronic component being connected in series with the existing electronic component.

4. The converter circuit as claimed in claim 1, wherein the electronic component is a diode.

5. The converter circuit as claimed in claim 1, wherein, in the case of the first switching group system, if a plurality of intermediate switching groups are provided, respectively adjacent intermediate switching groups are connected to one another in a chain.

6. The converter circuit as claimed in claim 1, wherein the number of intermediate switching groups in each switching group system of the further or of the n further switching group system or systems corresponds to the number of intermediate switching groups in the first switching group system, and wherein, in the case of the further or in the case of each of the n further switching group system or systems if a plurality of intermediate switching groups are provided, respectively adjacent intermediate switching groups are connected to one another in series.

7. The converter circuit as claimed in claim 6, wherein each intermediate switching group in the first further switching group system is connected in series with in each case one intermediate switching group in the first switching group system.

8. The converter circuit as claimed in claim 7, wherein if $n \geqq 2$, each intermediate switching group in the n-th further switching group system is connected in series to in each case one intermediate switching group in the (n−1)-th switching group system.

9. The converter circuit as claimed in claim 2, wherein the electronic component is a diode.

10. The converter circuit as claimed in claim 3, wherein the electronic component is a diode.

11. The converter circuit as claimed in claim 2, wherein, in the case of the first switching group system, if a plurality of intermediate switching groups are provided, respectively adjacent intermediate switching groups are connected to one another in a chain.

12. The converter circuit as claimed in claim 3, wherein, in the case of the first switching group system, if a plurality of intermediate switching groups are provided, respectively adjacent intermediate switching groups are connected to one another in a chain.

13. The converter circuit as claimed in claim 4, wherein, in the case of the first switching group system, if a plurality of intermediate switching groups are provided, respectively adjacent intermediate switching groups are connected to one another in a chain.

14. The converter circuit as claimed in claim 2, wherein the number of intermediate switching groups in each switching group system of the further or of the n further switching group system or systems corresponds to the number of intermediate switching groups in the first switching group system, and wherein, in the case of the further or in the case of each of the n further switching group system or systems if a plurality of intermediate switching groups are provided, respectively adjacent intermediate switching groups are connected to one another in series.

15. The converter circuit as claimed in claim 3, wherein the number of intermediate switching groups in each switching group system of the further or of the n further switching group system or systems corresponds to the number of intermediate switching groups in the first switching group system, and wherein, in the case of the further or in the case of each of the n further switching group system or systems if a plurality of intermediate switching groups are provided, respectively adjacent intermediate switching groups are connected to one another in series.

16. The converter circuit as claimed in claim 4, wherein the number of intermediate switching groups in each switching group system of the further or of the n further switching group system or systems corresponds to the number of intermediate switching groups in the first switching group system, and wherein, in the case of the further or in the case of each of the n further switching group system or systems if a plurality of intermediate switching groups are provided, respectively adjacent intermediate switching groups are connected to one another in series.

17. The converter circuit as claimed in claim 5, wherein the number of intermediate switching groups in each switching group system of the further or of the n further switching group system or systems corresponds to the number of intermediate switching groups in the first switching group system, and wherein, in the case of the further or in the case of each of the n further switching group system or systems if a plurality of intermediate switching groups are provided, respectively adjacent intermediate switching groups are connected to one another in series.

18. The converter circuit as claimed in claim 10, wherein, in the case of the first switching group system, if a plurality of intermediate switching groups are provided, respectively adjacent intermediate switching groups are connected to one another in a chain.

19. The converter circuit as claimed in claim 18, wherein the number of intermediate switching groups in each switching group system of the further or of the n further switching group system or systems corresponds to the number of intermediate switching groups in the first switching group system, and wherein, in the case of the further or in the case of each of the n further switching group system or systems if a plurality of intermediate switching groups are provided, respectively adjacent intermediate switching groups are connected to one another in series.

20. The converter circuit as claimed in claim 19, wherein each intermediate switching group in the first further switching group system is connected in series with in each case one intermediate switching group in the first switching group system.

* * * * *